United States Patent
Guajardo Merchan et al.

(10) Patent No.: US 8,502,669 B2
(45) Date of Patent: Aug. 6, 2013

(54) EXTENDED FUNCTIONALITY OF RFID DEVICES

(75) Inventors: Jorge Guajardo Merchan, Eindhoven (NL); Geert Jan Schrijen, Eindhoven (NL); Claudine Viegas Conrado, Eindhoven (NL); Antoon Marie Henrie Tombeur, Eindhoven (NL); Pim Theo Tuyls, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 673 days.

(21) Appl. No.: 12/441,582

(22) PCT Filed: Sep. 19, 2007

(86) PCT No.: PCT/IB2007/053797
§ 371 (c)(1),
(2), (4) Date: Mar. 17, 2009

(87) PCT Pub. No.: WO2008/035296
PCT Pub. Date: Mar. 27, 2008

(65) Prior Publication Data
US 2010/0026461 A1 Feb. 4, 2010

(30) Foreign Application Priority Data
Sep. 22, 2006 (EP) ..................... 06121120

(51) Int. Cl.
*G08B 13/14* (2006.01)
(52) U.S. Cl.
USPC ............ 340/572.1; 340/10.2; 340/572.5; 340/5.1
(58) Field of Classification Search
USPC ........... 340/10.2, 572.5, 572.3, 10, 5, 527.1, 340/572.7, 5.1, 10.33
See application file for complete search history.

(56) References Cited

U.S. PATENT DOCUMENTS

| 6,068,193 A | 5/2000 | Kreft |
| 6,498,923 B2 * | 12/2002 | Ikefuji et al. ........... 455/41.1 |

(Continued)

FOREIGN PATENT DOCUMENTS

| WO | 0034605 A1 | 6/2000 |
| WO | 2004053721 A1 | 6/2004 |

OTHER PUBLICATIONS

L. Bolotnyy et al, "Multi-Tag Radio Frequency Identification Systems", Proc. IEEE Workshop on Automated Identification Advanced Technologies, Oct. 2005, pp. 83-88.

(Continued)

*Primary Examiner* — Hoi Lau

(57) ABSTRACT

It is described a RFID device (231*a*, 231*b*, 231*c*, 331) comprising a data memory (236) and an electronic circuit arrangement (237, 238, 239, 247) coupled thereto. The electronic circuit arrangement has a first and a second operational configuration, wherein by receiving a control command (250*a*) the electronic circuit arrangement can be switched irreversibly from the first to the second configuration. The RFID device further comprises a communication interface (245) being coupled to the electronic circuit arrangement. In the first configuration the RFID device is adapted to communicate with a standard RFID reader (110) via the communication interface. In the second configuration the communication with the standard RFID reader is disabled and the RFID device is adapted to communicate with a readout-RFID device (370). The RFID device may be equipped with a secondary communication interface that can be used to communicate with the RFID device in a privacy-preserving manner. After the RFID device has been disabled, the secondary interface can be used to access data in a secure manner.

16 Claims, 3 Drawing Sheets

U.S. PATENT DOCUMENTS

| | | | |
|---|---|---|---|
| 6,572,016 B2* | 6/2003 | Saveliev et al. | 235/383 |
| 6,970,070 B2 | 11/2005 | Juels et al. | |
| 7,068,169 B2* | 6/2006 | Collins et al. | 340/572.1 |
| 7,152,040 B1* | 12/2006 | Hawthorne et al. | 705/16 |
| 7,245,213 B1* | 7/2007 | Esterberg et al. | 340/539.12 |
| 7,280,045 B2* | 10/2007 | Saarisalo et al. | 340/572.7 |
| 7,474,211 B2* | 1/2009 | Kramer | 340/572.1 |
| 7,716,160 B2* | 5/2010 | Smith et al. | 340/10.2 |
| 7,843,347 B2* | 11/2010 | Nikitin et al. | 340/572.7 |
| 7,893,816 B1* | 2/2011 | Kwan | 340/10.34 |
| 2001/0024157 A1* | 9/2001 | Hansmann et al. | 340/10.41 |
| 2003/0025588 A1* | 2/2003 | Meier et al. | 340/5.2 |
| 2004/0222878 A1 | 11/2004 | Juels | |
| 2004/0246134 A1* | 12/2004 | Collins et al. | 340/572.1 |
| 2004/0263319 A1* | 12/2004 | Huomo | 340/10.2 |
| 2005/0116825 A1* | 6/2005 | Manneschi | 340/551 |
| 2005/0116826 A1 | 6/2005 | Wertsebrger | |
| 2005/0205678 A1 | 9/2005 | Ponert | |
| 2006/0033608 A1 | 2/2006 | Juels et al. | |
| 2006/0043198 A1* | 3/2006 | Forster | 235/492 |
| 2006/0066444 A1 | 3/2006 | Steeves | |
| 2006/0152342 A1* | 7/2006 | Turner et al. | 340/10.2 |
| 2006/0187046 A1* | 8/2006 | Kramer | 340/572.3 |
| 2006/0197651 A1* | 9/2006 | Lee et al. | 340/5.61 |
| 2006/0202830 A1* | 9/2006 | Scharfeld et al. | 340/572.7 |
| 2006/0220795 A1* | 10/2006 | Limbachiya | 340/10.5 |
| 2006/0232383 A1* | 10/2006 | Yoon et al. | 340/10.2 |
| 2007/0008139 A1* | 1/2007 | Saarisalo et al. | 340/572.7 |
| 2007/0008169 A1* | 1/2007 | Conero et al. | 340/825.69 |
| 2007/0046434 A1* | 3/2007 | Chakraborty | 340/10.1 |
| 2007/0046467 A1* | 3/2007 | Chakraborty et al. | 340/572.1 |
| 2007/0069852 A1* | 3/2007 | Mo et al. | 340/5.1 |
| 2007/0080782 A1* | 4/2007 | Breitfuss | 340/10.1 |
| 2007/0109099 A1* | 5/2007 | Raphaeli et al. | 340/10.2 |
| 2007/0139163 A1* | 6/2007 | Powell et al. | 340/10.2 |
| 2007/0167139 A1* | 7/2007 | Inano et al. | 455/88 |
| 2007/0188342 A1* | 8/2007 | Valeriano et al. | 340/825.49 |
| 2007/0194929 A1* | 8/2007 | Wagner et al. | 340/572.7 |
| 2007/0236334 A1* | 10/2007 | Borovoy et al. | 340/10.2 |
| 2007/0241906 A1* | 10/2007 | Malik | 340/572.7 |
| 2007/0241908 A1* | 10/2007 | Coop | 340/572.8 |
| 2007/0273514 A1* | 11/2007 | Winand et al. | 340/572.1 |
| 2008/0001724 A1* | 1/2008 | Soleimani et al. | 340/10.51 |
| 2008/0001746 A1* | 1/2008 | Childress et al. | 340/572.1 |
| 2008/0034183 A1* | 2/2008 | Drago et al. | 711/219 |
| 2008/0065957 A1* | 3/2008 | Shoarinejad et al. | 714/758 |
| 2008/0068174 A1* | 3/2008 | Al-Mahdawi | 340/572.7 |
| 2008/0169909 A1* | 7/2008 | Park et al. | 340/10.4 |
| 2008/0197974 A1* | 8/2008 | Kim | 340/10.1 |
| 2008/0238630 A1* | 10/2008 | Chen et al. | 340/10.5 |
| 2009/0033465 A1* | 2/2009 | Mickle et al. | 340/10.1 |
| 2009/0033493 A1* | 2/2009 | Lin et al. | 340/572.1 |
| 2009/0088077 A1* | 4/2009 | Brown et al. | 455/41.2 |
| 2010/0026461 A1* | 2/2010 | Merchan et al. | 340/10.1 |
| 2010/0079261 A1* | 4/2010 | Goto et al. | 340/10.51 |
| 2010/0123556 A1* | 5/2010 | Rofougaran et al. | 340/10.1 |
| 2010/0141387 A1* | 6/2010 | Kosaka | 340/10.1 |

OTHER PUBLICATIONS

S.L. Garfinkel, et al, RFID Privacy: An Overview of Problems and Proposed Solutions, IEEE Security and Privacy, 3(3), pp. 34-43, May/Jun. 2005.

A. Juels, "RFID Security and Privacy: A Research Survey", IEEE Journal on Selected Areas in Communications, 24(2) 381-394, Feb. 2006.

S.A. Weis et al, "Security and Privacy Aspects of Low-Cost Radio Frequency Identification Systems", International Conference on Security in Pervasive Computing, Mar. 2003.

* cited by examiner

EXTENDED FUNCTIONALITY OF RFID DEVICES

FIELD OF INVENTION

The present invention relates to the field of Radio Frequency Identification (RFID) devices. In particular the present invention relates to an RFID device allowing for a preservation of the privacy of a user carrying RFID tagged items.

Further, the present invention relates to a readout-RFID device having a readout communication interface.

Furthermore, the present invention relates to a RFID system comprising the above-identified RFID device and the above-identified readout-RFID device and to a method for extracting information stored on the above-identified RFID device.

BACKGROUND OF THE INVENTION

Radio Frequency Identification (RFID) is an emerging technology with numerous applications, e.g. as smart labels or tags. RFID devices respectively RFID tags vary greatly in their cost and capabilities. At the low end, there are low-cost tags that are passive, getting their power from the reader, with limited computational, storage, and communication capabilities. Major applications of such tags are as replacements for barcodes being used for Electronic Product Codes (EPC) tags and as a track-and-trace tool to prevent product counterfeiting e.g. in the pharmaceuticals industry. Further, RFID tags are used in production and/or logistics in order to individually trace the treatment for each article to be produced. However, RFID tags have also applications at the consumer side, with the possibility to uniquely identify items in the home and support a number of home activities.

However, low-cost RFID tags present serious security problems. In some cases low-cost RFID devices can pose a privacy threat to its users. For example, if information that is on the tags is not protected from making the information available to unauthorized parties, such an unauthorized party can surreptitiously obtain information about the tagged items that a person is carrying. This information can then be used to track the person carrying the tagged items, find out information about his or her preferences, infer transactions happening between individuals, etc. For a detailed overview of threats and available solutions for the RFID privacy problem reference is made to the publication "S. L. Garfinkel, A. Juels, R. Pappu, RFID Privacy: An Overview of Problems and Proposed Solutions, IEEE Security and Privacy, 3(3), 34-43, May/June 2005".

One standardized solution to prevent this type of threat in current systems is the so-called "kill-command" that permanently disables a tag. This type of solution is effective but has the big drawback of rendering RFID tags useless when applying such a kill-command e.g. after a point-of-sale terminal. In particular, an object with an embedded RFID tag cannot interact anymore or provide information to a legitimate user even if the user would desire it.

U.S. Pat. No. 6,970,070 discloses another solution for maintaining privacy in connection with RFID tags. This solution includes using a so-called blocker tag, which effectively acts as a wall between RFID tags carried by an individual and potentially unauthorized RFID readers. The blocker tag simulates the tags under its domain and interferes with the singulation protocol performed by the reader in order to identify the tag. Since the reader cannot identify the tag, the user's privacy is safeguarded.

US 2004/0222878 A1 discloses another approach towards preserving privacy in connection with the usage of RFID devices. This approach is based on the use of pseudonyms that are updated by a reader periodically and sent to the tag encrypted with a one-time pad.

The publication "S. A. Weis, S. E. Sarma, R. L. Rivest, D. W. Engels, Security and Privacy Aspects of Low-Cost Radio Frequency Identification Systems, International Conference on Security in Pervasive Computing, March 2003" discloses yet other solutions for preserving privacy in connection with the usage of RFID devices. These solutions involve the use of cryptographic primitives such as hash functions. However, such solutions would require additional resources that cheap RFID tags are not expected to have.

The publication "Bolotnyy, L. and Robins, G., Multi-Tag Radio Frequency Identification Systems, Proc. IEEE Workshop on Automated Identification Advanced Technologies, October, 2005, pp. 83-88" discloses the usage of multiple RFID tags for increasing the sensitivity of a multiple RFID tag system by increasing the overall voltage, which is induced in the multiple RFID tag system by a RFID reader. In particular if the different RFID tags are oriented in different directions with respect to the angle of incidence the expected voltage on the best-oriented RFID tag is increased significantly.

The publication "A. Juels, RFID Security and Privacy, A Research Survey, IEEE Journal on Selected Areas in Communications, 24(2) 381-394, February 2006" discloses a proposal for effacing unique identifiers in tags at the point of sale of a shop in order to address the tracking problem, but retaining product-type identifiers such as traditional barcode data for later use. It is suggested that consumer products may be equipped with relabel tags comprising new identifiers, but that old tag identifiers remain subject to reactivation for later public uses, like recycling. As a physical mechanism for realizing this idea, it is also proposed to explore the idea of splitting product-type identifiers and unique identifiers across two RFID tags. By peeling off one of these two tags, a consumer can reduce the granularity of tag data. This idea can be extended in that users can physically alter tags to limit their data emission and obtain physical confirmation of their changed state.

US 2005/0205678 A1 discloses a data carrier that has a dual interface unit with a contact interface as a second interface as well as an antenna. The disclosed RFID unit in the data carrier is connectable to an Internet-enabled personal computer via a standard interface such as for example a USB plug.

There may be a need for providing RFID devices with an extended functionality, such extended functionality compared to unprotected RFID devices, on the one hand allows to increase the privacy of a user and on the other hand does not cause an extensive increase with respect to complexity and costs of the RFID devices.

SUMMARY OF THE INVENTION

This need may be met by the subject matter according to the independent claims. Advantageous embodiments of the present invention are described by the dependent claims.

According to a first aspect of the invention there is provided a RFID device. The RFID device comprises (a) a data memory and (b) an electronic circuit arrangement, which is coupled to the data memory. The electronic circuit arrangement has a first operational configuration and a second operational configuration, wherein by receiving a control command the electronic circuit arrangement can be switched irreversibly from the first operational configuration to the second operational configuration. The RFID device further comprises (c) a communication interface, which is coupled to the electronic circuit arrangement. In the first operational configuration the RFID device is adapted to communicate with a standard RFID reader via the communication interface, and in the second operational configuration the communication with the standard RFID reader is disabled and the RFID device is adapted to communicate with a readout-RFID device.

This aspect of the invention is based on the idea that by modifying the communication interface of the RFID device by means of the control command, standard RFID reader will not be able any more to extract data being stored in the data memory. However, by contrast to known RFID tags, which are destroyed by such a command, the described RFID device is still able to communicate not with a standard RFID reader but at least with the special designed readout-RFID device.

The readout-RFID device may be a RFID tag, which can be used almost in the same manner as the RFID device. This means that the readout-RFID device is an autarkic electronic device, which may be attached to consumer products or other items in order to provide an authorized used with product related information.

The electronic circuit arrangement may be any type of circuitry comprising various electronic components, circuit paths and at least one switching element which is adapted to transfer the circuit arrangement from the first operational configuration to the second operational configuration. The switching element may be an element, which turns over a circuit path from a first contact to a second contact. The switching element may also be an element, which irreversibly opens a circuit path such that a disruption of the corresponding circuit path is generated.

Typically, the communication interface is an antenna element. The antenna element may be an off-chip antenna formed outside the inner housing of a RFID chip, which housing includes the data memory and/or at least a part of the electronic circuit arrangement.

The predefined control command or control signal can be applied to the RFID device from an external device. Since this command irreversibly changes the configuration of the electronic circuit arrangement, such a command can also be referred to as a modified "kill"-command. Of course the control command can be triggered and/or induced by means of an appropriate radio frequency signal or any other wireless signal being generated and transmitted by an appropriate remote control device. The remote control device can also be an RFID reading having a functionality as described.

The term communication has to be understood in a wide manner. In this context, the term communication means any type of data transfer between two parties, whereby the corresponding information is transferred in two or only in one direction. Here, a first communication party is the RFID device and the second communication party is the readout-RFID device.

According to an embodiment of the invention the RFID device is a passive RFID device. This may provide the advantage that the RFID device can be realized by means of a cheap electronic device which can be used e.g. for tagging consumer products with price information or any other information such as date of expiry or an individual electronic product code (EPC). Thereby, the passive RFID may be embedded in the consumer product or in the package of the consumer products. Because of the low manufacturing costs of a passive RFID device it can be disposable article, which may be trashed after usage.

It has to be mentioned that passive RFID devices or tags are defined by having no internal power supply. The minute electrical current induced in the antenna element by the incoming radio frequency signal provides just enough power for the electronic circuit arrangement, which preferably comprises a CMOS integrated circuit to power up the RFID device and transmit a response. Lack of an onboard power supply means that the device can be both very small and very cheap. Therefore, commercially available products can be offered and/or provided with passive RFID chips, which can be embedded under the skin.

According to a further embodiment of the invention, in the second operational configuration, the RFID device is capable of communicating with the readout-RFID device in a privacy-preserving manner. Thereby, privacy aspects are based on the physical characteristics of the electronic circuit arrangement embedded in the RFID device. For example, the privacy may be maintained by limiting the spatial range of coverage of the corresponding data transfer between the RFID device and the readout-RFID device. However, also encryption or coding procedures may be used for guaranteeing a privacy maintaining communication between the RFID device and the readout-RFID device.

According to a further embodiment of the invention, in the second operational configuration, the spatial read range surrounding the RFID device is limited to a near field communication, in particular to a near field communication over a distance of 1 cm, preferably over a distance of 1 mm. This has the effect that for extracting data from the RFID device being in the second operational configuration the readout-RFID device has to be located in close proximity to the RFID device. This can be achieved e.g. by gluing or sticking the readout-RFID device directly or indirectly onto or next to the RFID device.

According to a further embodiment of the invention the electronic circuit arrangement comprises a switching element, which is adapted to decouple at least a part of the communication interface from the data memory, when the RFID device receives the control command.

A switching element may be arranged in the electronic circuit in such a manner that by receiving the control command a conductor path connecting the data memory with the communication interface is interrupted. Thereby, a complete decoupling between the data memory and the communication interface may be achieved. Such switching elements, which are sensitive to command signals, are widely known in the field of RFID tags. Therefore, it is not necessary to explain their physical mode of functionality in more detail.

According to a further embodiment of the invention the RFID device further comprises a further communication interface, which is adapted to exclusively allow communication between the RFID device and the readout-RFID device. This means that the RFID device comprises at least two communication interfaces. By receiving a command signal respectively a modified kill command, the first typically antenna based communication interface is disabled. Therefore, communication with a standard RFID reading device is no more possible. The second respectively further communication interface is connected to the data memory in such a manner that the readout-RFID device is able to communicate with the RFID device even if the RFID device respectively the first communication interface of the RFID device has been killed.

The second communication interface may be a further antenna element, which is adapted to communicate with the readout-RFID device by means of electromagnetic radiation having a different frequency that the communication interface being used for a communication between the RFID device and standard RFID readers.

According to a further embodiment of the invention the further communication interface is a physical contact interface and/or a galvanic interface, which is adapted to be connected to a corresponding readout interface of the readout-RFID device. After the control respectively the kill command has been issued and the first communication interface is unusable, it is possible to get access to the data memory content of the RFID device only via the further communication interface.

According to a further embodiment of the invention the electronic circuit arrangement comprises a switching element, which is adapted to modify the communication interface, when the RFID device receives the control command. By activating the switching element other electronic components may be added or may be removed from a circuit portion representing the coupling between the data memory and the antenna element. Such electronic components may be for instance resistors, diodes, capacitors and/or inductors.

According to a further embodiment of the invention the switching element is adapted to modify the frequency band of the operating frequency of the RFID device. This may be realized in a simple but very effective manner by changing the resonance frequency of the RFID device, which resonance frequency is predominantly determined by the inductive and capacitive reactance of the antenna element and the electronic circuit arrangement. The resonance frequency may be varied in an in particular effective manner by disconnecting a capacitor from or connecting a capacitor to the antenna element. Thereby the resonance frequency of an oscillating circuit comprising inter alia the antenna element is varied. The corresponding capacitor may be connected in parallel to the antenna element.

The operating frequency may be changed for instance from 13.56 MHz to 2.45 GHz or vice versa. Such a big difference between a first operating frequency being assigned to the first operational configuration and a second operating frequency being assigned to the second operational configuration provides for a reliable separation between (a) the first communication between the RFID device and a standard RFID reader and (b) the second communication between the RFID device and a reader RFID device.

According to a further embodiment of the invention the switching element is adapted to change the coupling mode of the RFID device. In particular the coupling mode may be changed from an inductive coupling between the RFID device and the standard RFID reader to a capacitive coupling between the RFID device and the reader RFID device. This may provide the advantage that typically the spatial range of coverage is decreased, which further contributes that the communication between the RFID device and the reader RFID device cannot be listened by an unauthorized third party. Of course, also a change of the coupling mode in a reverted direction is possible.

The coupling mode could be changed by a modified kill command from e.g. inductive to capacitive. Thereby, the kill command disables the RFID device such that it can not be interrogated any further by a standard RFID reader. However, data residing in the memory can still be read either through a dedicated readout-RFID device.

According to a further aspect of the invention there is provided a readout-RFID device. The provided RFID device comprises a readout communication interface, which is adapted to communicate with a RFID device according to any one of the embodiments described above, when the electronic circuit arrangement of the RFID device is in the second operational configuration.

This further aspect of the invention is based on the idea that a cheap readout device is provided, which allows data extraction from the RFID device even if the RFID device has been modified or killed such that standard RFID readers are no more capable to communicate with the RFID device.

According to an embodiment of the invention the readout-RFID device is a passive readout-RFID device. This has the advantage that the readout-RFID device may be realized by means of a low cost RFID device. This means that both the RFID device and the readout-RFID device can be a small and a cheap electronic device. Because of the low manufacturing costs the passive readout-RFID devices can be manufactured as disposable articles, which may be trashed after usage. Therefore, a wide variety of different applications are opened for using the readout-RFID device in a beneficial manner.

It has to be mentioned that the readout-RFID device may be an electronic device, which is from the computational side not more powerful than the RFID device. The readout-RFID device is rather a device that has capabilities in the same range as that of the traditional passive low-cost RFID tags, which often carry electronic product codes. This means that the capability of authentication of the readout-RFID device is limited. However, since a passive readout-RFID device may be produced at very low manufacturing costs, many applications may be thinkable even if there is no authentication possible.

Further, it has to be mentioned that it is not necessary that the readout-RFID tag must have an identifier of its own such as an electronic product code or the like. The readout-RFID tag may be able to adopt or inherit the identifier of a less powerful RFID tag to which it is connected.

For example, the low cost of the readout-RFID device may allow for the following widely applicable usage model: A user buys tagged items, i.e. item being provided with RFID devices as described above. These RFID tags are killed upon purchase by means of appropriate control commands. Since also the readout-RFID tags are very cheap, the user can have a large number of them. These readout-RFID tags may be bought by the user via purchase or alternatively may be given from the corresponding shop to the user for free. The readout-RFID devices can then be stuck to all items purchased in order to resurrect the information being stored in the killed RFID devices. Since the cheap reading tags have no authentication capabilities, this can be done in an environment with only trusted readers, such as the user's home.

According to a further embodiment of the invention, compared to the RFID device, the readout-RFID device is more powerful with respect to its computational capabilities. In this respect the term powerful means that the readout-RFID device comprises a wider functionality as compared to the RFID device. The functionality of the readout-RFID device may include for instance coding or encryption procedures, which may allow for a tap-proof data connection between the RFID device and the readout-RFID device and/or between the read-out device and the reader.

The more powerful readout-RFID tag may be re-usable, thus it is envisioned that the readout tag is implemented as a sticky label that adheres to objects whose original RFID tags have been killed. Thereby, sticking the more powerful readout-RFID tag next to or preferably onto the less powerful original RFID tag has the effect of resurrecting information stored in the original RFID tag. Thereby, the user is able to take advantage of the information stored in the killed tag just as if the tag in the object had never been killed. However, there is the added advantage that the identifier is now transmitted to the readers in a secure manner.

According to a further embodiment of the invention the readout communication interface is adapted to communicate with the RFID device in a privacy preserving manner. The privacy aspects may be based on the physical characteristics both of the readout communication interface and of the electronic circuit arrangement embedded in the RFID device. For example, the privacy may be maintained by limiting the spatial range of coverage of the corresponding data transfer between the RFID device and the readout-RFID device. Also a special dedicated coupling mode between the RFID device and the readout-RFID device may be used, which coupling mode prevents a data communication between the RFID device and standard RFID readers.

Of course, also encryption or coding procedures may be used for guaranteeing a privacy maintaining communication between the RFID device and the readout-RFID device.

According to a further embodiment of the invention the readout-RFID device comprises authentication capability. This may be realized by using cryptographic primitive functions.

According to a further aspect of the invention there is provided a RFID system. The RFID system comprises (a) a RFID device according to any one of the embodiments described above, (b) a readout-RFID device as described above and (c) a reader, which is adapted to communicate with the readout-RFID device.

This further aspect of the invention is based on the idea that a comparatively cheap but also reliable possibility is provided for extracting information stored in an RFID device, which has been made inaccessible for standard RFID readers by means of an appropriate control respectively a modified kill command. However, before extracting the stored information from the readout-RFID device, the information has to be transferred from the RFID device to the readout-RFID device. This means that in a first step the information is transferred between two similar devices. This makes it comparatively easy to allow for a secure and tap-proof communication between the RFID device and the readout-RFID device.

Preferably, the reader is adapted to communicate with the readout-RFID device in a privacy-maintaining manner e.g. by employing coding and/or encryption procedures.

The reader may be a traditional or a modified reader. Thereby, a traditional reader is a reader, which allows for a communication within a frequency range, which is commonly used for standard RFID devices. A modified read may be a reader, which selectively allows for a communication between the RFID device and the readout-RFID device. Such a selective communication may be achieved e.g. by means of a coded communication or by means of an RF information within a RF frequency bandwidth being not typical for RFID communication.

According to an embodiment of the invention the RFID system further comprises an indicator, which allows a user to identify the location on a consumer product, where the RFID device is embedded. This may provide the advantage that in order to resurrect information being stored in the killed RFID device, a user immediately knows where to place the readout-RFID device in order to guarantee a secure and reliable data communication between the killed or disabled RFID device and the readout-RFID device. This holds in particular if the spatial range of coverage of the corresponding data transfer between the RFID device and the readout-RFID device is limited e.g. because of privacy maintaining aspects.

According to a further aspect of the invention there is provided a method for extracting information stored on a RFID device as described above. The method comprises the steps of (a) transmitting information related data from the RFID device to a readout-RFID device as described above and (b) transmitting the data from the readout-RFID device to a reader.

This further aspect of the invention is based on the idea that a two-step data extraction procedure via the intermediate readout-RFID device may be used in order to extract the information in a privacy-maintaining manner. Thereby, in a first step the communication takes place between two similar devices, which might be arranged in close proximity with respect to each other.

According to an embodiment of the invention the method further comprises the step of applying a control command to the RFID device such that a communication between the RFID device and a standard RFID reader is disabled. Typically, the control command is a kill command or a modified kill command, which disables or modifies a communication interface of the RFID device in an appropriate way. This can be done by using dedicated switching elements for a circuit arrangement of the RFID device, which switching elements, upon activation, cause an antenna element to be decoupled from the data memory and/or cause an operating frequency of the RFID device to change significantly.

According to a further embodiment of the invention the step of transmitting information related data from the RFID device to a readout-RFID device is carried out in a passive manner. This means that both devices, the RFID device and the readout-RFID device, may be so-called passive RFID devices. This means that there is no communication between the RFID device and the readout-RFID device unless a third device, which typically is a reader, provides enough power to operate the RFID device and the readout-RFID device. This may provide the advantage that the described method can be accomplished with simple RFID devices, which can be manufactured at low manufacturing costs of passive RFID devices.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
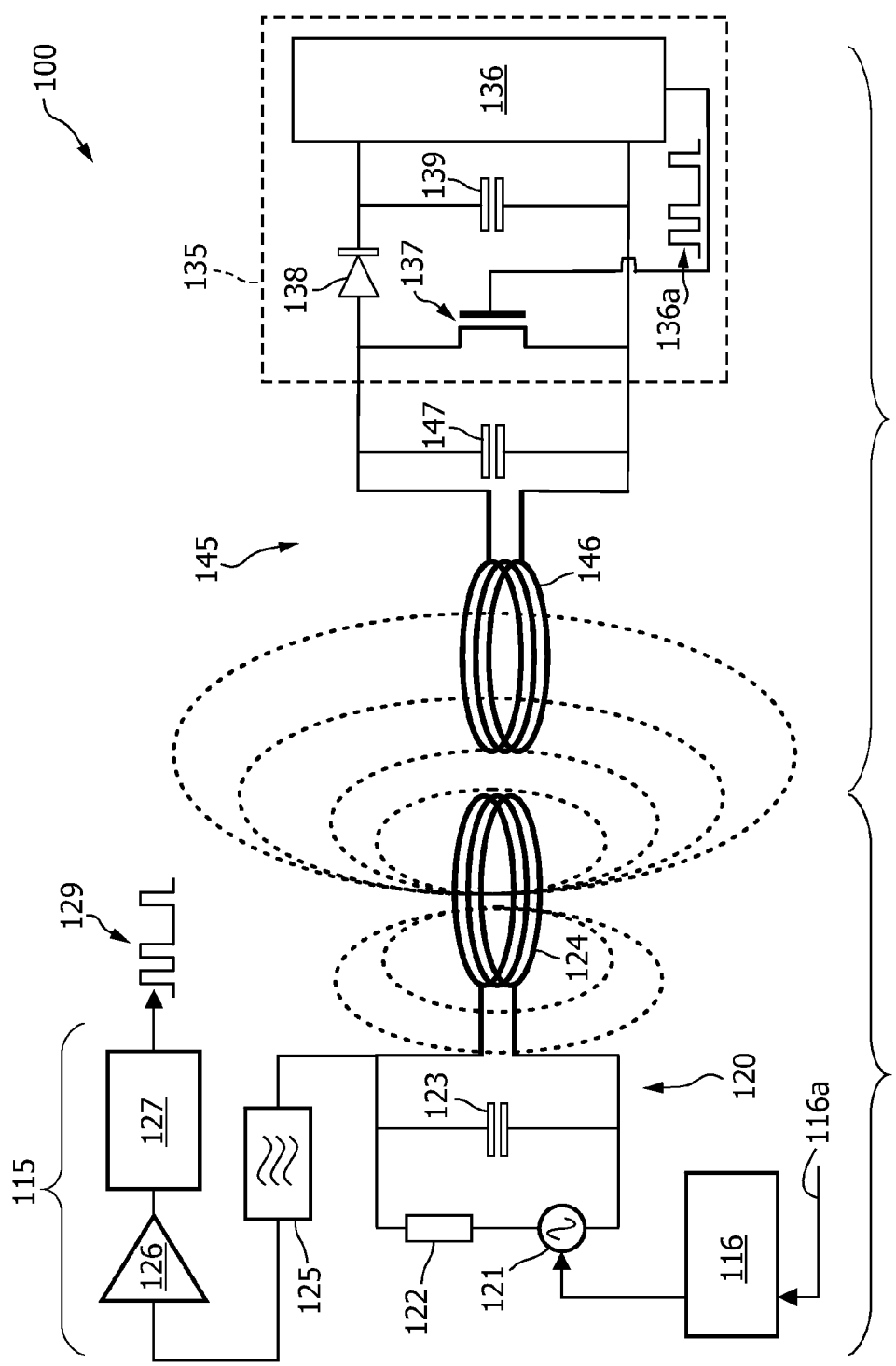
FIG. 1 shows a RFID system comprising a standard RFID reader and a standard RFID device carrying coded information.

The illustration in the drawing is schematically. It is noted that in different Figures, similar or identical elements are provided with reference signs, which are different from the corresponding reference signs only within the first digit.

FIG. 1 shows a RFID system 100, which comprises a standard RFID reader 110 and a standard RFID device 130, which represents a RFID tag carrying coded information. The RFID reader 110 comprises an electronic circuit 115 and an antenna 124. The antenna 124 is used both for transmitting RF radiation signals to the RFID device 130 and for receiving coded RF radiation signals backscattered from the RFID device 130.

The electronic circuit 115 comprises a so-called Amplitude Shift Keying (ASK) modulator 116. The operation of the ASK modulator 116 can be triggered by a drive signal 116a. The ASK modulator 116 is coupled to an oscillating circuit 120 via a signal injecting unit 121 being a part of the oscillating circuit 120. The oscillating circuit 120 further comprises a resistor 122, a capacitor 123 and the antenna 124.

The communication between the RFID reader 110 and the RFID device 130 starts with transmitting a signal from the RFID reader 110 by means of the antenna 124 to the RFID device 130. The reception of this signal triggers the RFID device 130 to transmit a coded signal back to the RFID reader 110. The coded signal is picked up by the antenna 124.

In order to extract this coded signal from the antenna 124 respectively from the oscillating circuit 120 a band pass filter 125 is used. The band pass filter 125 is connected to a demodulator 127 via an amplifier 126. The demodulator 127 provides digital output data 129 representing the information, which has been transmitted from the RFID device 130 to the RFID reader 110.

The standard RFID device 130 comprises a RFID chip 135 and a communication interface 145. The RFID chip 135, which is typically protected by an appropriate housing, comprises an RFID circuitry 136 including a data memory. When an operation of the RFID device 130 is triggered by the RFID reader 110 the RFID circuitry 136 provides a binary modulation code 136a. This binary modulation code 136a is applied to the gate of a transistor coupling element 137, which drives an oscillating circuit comprising an antenna element 146 and a capacitor 147. The transistor coupling element is a MOSFET transistor. A diode 138 and a capacitor 139 are used for providing a suitable coupling between the RFID circuitry 136 and the oscillating circuit.

In the following exemplary embodiments of RFID devices according to the invention will be described with reference to the FIGS. 2a, 2b and 2c.

Figure 2A:
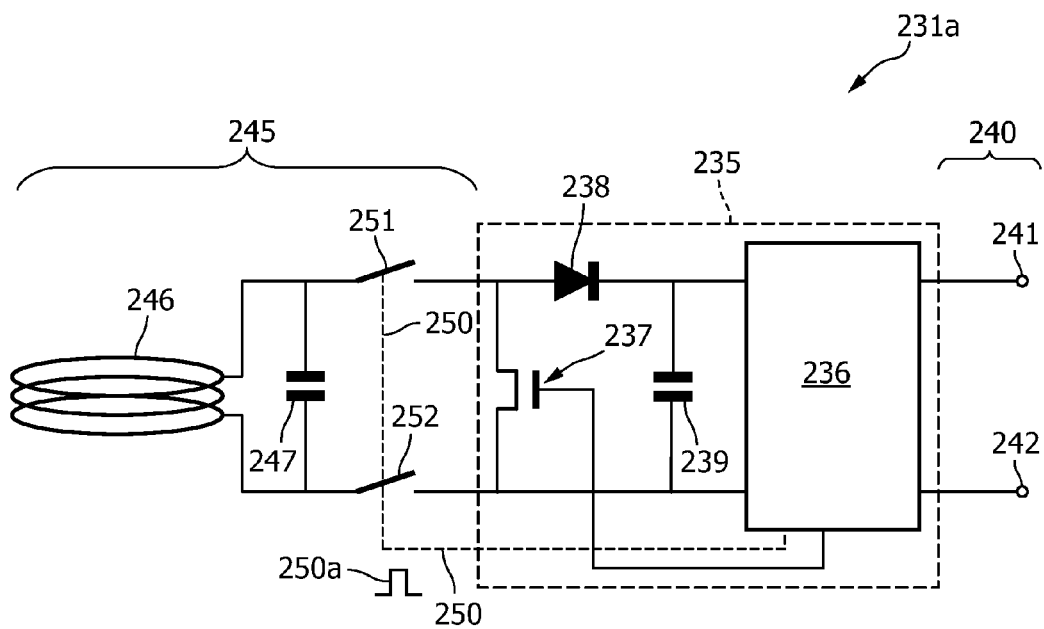
FIG. 2a shows a RFID device according to a first embodiment of the invention, the RFID device comprising a secondary communication interface and an Off-chip antenna element representing a primary communication interface, which antenna element is decoupled from the RFID chip upon applying a kill-code.

FIG. 2a shows a RFID device 231a according to a first embodiment of the invention. The RFID device 231a comprises an RFID chip 235. The RFID chip 235 comprises a RFID circuitry 236 including a data memory, a transistor coupling element 237, a diode 238 and a capacitor 239. These elements have already been described with reference to the standard RFID tag 130 shown in FIG. 1 and will not be explained in detail once again.

The RFID device 231a further comprises a communication interface 245, which comprises an antenna element 246 and a capacitor 247, both forming an oscillating circuit. This oscillating circuit can be completely disconnected from the RFID chip 235 by the activation two switching elements, a first switching element 251 and a second switching element 252. These switching elements 251 and 252 are both connected to a command line 250, which is used for applying a control command 250a to the switching elements 251 and 252. Once the switching elements 251 and 252 have been activated, the antenna element 246 is irreversibly disconnected from the RFID chip 235. Therefore, the control command 250a may be termed a kill command or at least a modified kill command, because the communication interface 245 will be permanently decoupled from the RFID chip 235 such that a data communication via the communication interface 245 is no more possible.

It has to be mentioned that of course for disabling the communication interface 245 it would be sufficient to only interrupt one connection line extending between the RFID chip 235 and the communication interface 245. However, a disconnection of both connection lines seems to be more reliably in order to make sure that the communication interface 245 is definitely disabled.

Switching elements, which are sensitive to command signals 250a, are widely known in the field of RFID tags. Therefore, their physical mode of functionality will not be explained herein in more detail.

However, in order to allow an access to the data stored in the data memory of the RFID circuitry 236 a further communication interface 240 is provided. This interface 240 comprises external galvanic contacts 241 and 242, which are connected to the RFID circuitry 236. Therefore, by connecting a readout-RFID device (not shown in FIG. 2a) to the RFID device 231a, the information being stored in the data memory of the RFID circuitry 236 can be extracted. Since this data extraction is carried out via a wired connection, unauthorized access to these data can be prevented if a used does not allow unauthorized readers to get a physically contact to the RFID device 231a.

Figure 2B:
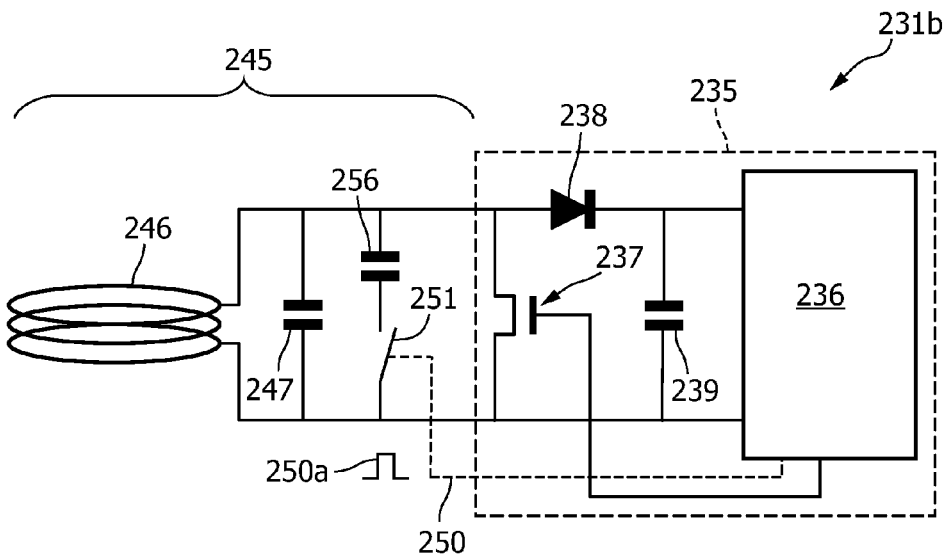
FIG. 2b shows a RFID device according to a second embodiment of the invention, whereby the operating frequency of the whole RFID device is modified upon applying a kill-code.

FIG. 2b shows a RFID device 231b according to a second embodiment of the invention. The RFID device 231b again comprises a RFID chip 235 and a RF communication interface 245. The RFID chip 235 is the same as the one of the first embodiment shown in FIG. 2a, except that there is no secondary interface provided. The communication interface 245 is modified in such a manner, that after activation of a switching element 251 by means of a control command, a capacitor 256 is disconnected from an oscillating circuit, which originally comprises an antenna element 246, a capacitor 247 and the capacitor 256. The disconnection of the capacitor 256 causes the resonance frequency of the oscillating circuit to change significantly, such that the operating frequency of the communication interface 245 is changed. The capacitance of the capacitors 247 and 256 have such a value, that after disconnecting the capacitor 256 the communication interface 245 and therewith the whole RFID device 231b is no more able to communicate with a standard RFID reader (not depicted in FIG. 2b). However, the operating frequency of the second operational state of the RFID device 231b is chosen such that a wireless communication between the RFID device 231b and a not depicted readout-RFID device is possible.

It has to be mentioned that the operating frequency and/or the RF transmitting power of the second operational state can be chosen such that only a near field communication is possible. Therefore, in order to allow for a data extraction from the killed RFID device 231b to the readout-RFID device the latter has to be placed in close proximity to the communication interface 245 of the killed RFID device 231b. Such a near field condition regarding the placement of readout-RFID devices makes it comparatively easy to provide a communication barrier for unauthorized parties. Therefore, the privacy of a user carrying items with a killed RFID tag can be preserved in a simple but effective manner.

Figure 2C:
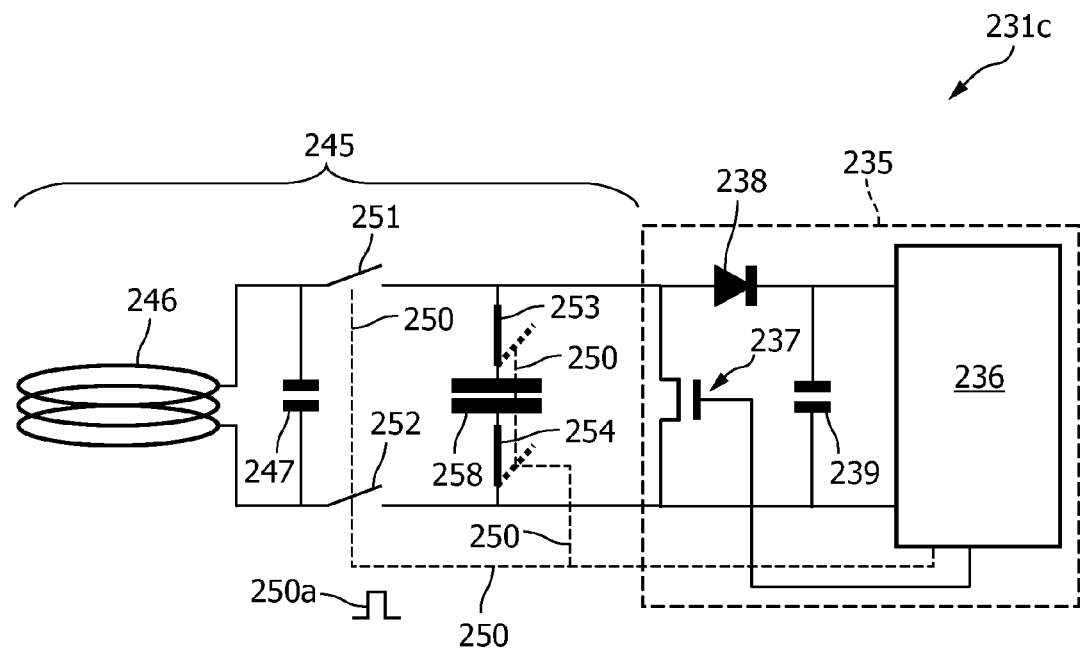
FIG. 2c shows a RFID device according to a third embodiment of the invention, whereby the coupling between the RFID chip and the Off-chip antenna element is modified upon applying a kill-code.

FIG. 2c shows a RFID device 231c according to a third embodiment of the invention. The RFID device 231c comprises a RFID chip 235 and a RF communication interface 245. The RFID chip 235 is the same as the one according to the second embodiment shown in FIG. 2b. The communication interface 245 may be switched from a first operational state to a second operational state by a simultaneous activation of altogether four switching element 251, 252, 253 and 254 by means of a control command 250a. Thereby, the control command 250a opens the switching elements 251 and 252 such that the antenna element 246 together with a capacitor 247 is completely disconnected from the RFID chip 235 of the RFID device 231c. At the same time the control command 250a closes the switching elements 253 and 254 such that a capacitor 258 is connected to the RFID chip 235. This means that in the second operational state a communication between the RFID device 231c and a not depicted readout-RFID device is only possible by means of a wireless capacitive coupling via the capacitor 258 by contrast to an inductive coupling in the first operational state.

Since typically for capacitive coupling the spatial range of coverage is much smaller than for inductive coupling, a data extraction, which is possible only via capacitive coupling automatically contributes to an improved privacy. This holds because a readout-RFID device has to be placed in close proximity to the RFID device 231c, which has been traversed into the second operational state by means of a modified kill command 250a.

Figure 3:
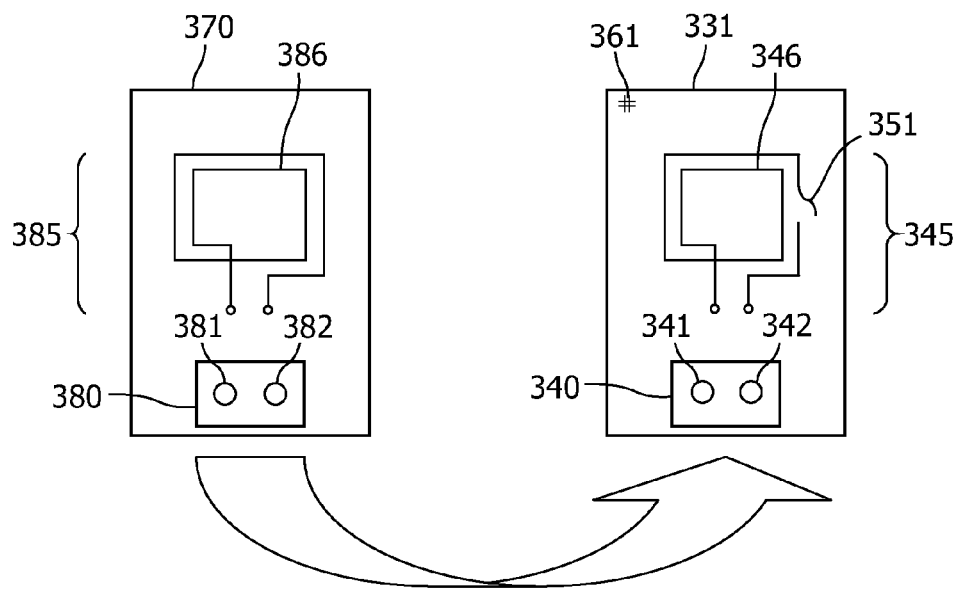
FIG. 3 shows the attachment of a readout-RFID device at a killed RFID device in order to resurrect a communication between the RFID device and the readout-RFID device.

FIG. 3 shows the attachment of a readout-RFID device 370 at a killed RFID device 331 in order to resurrect a communication between the RFID device 331 and the readout-RFID device 370. The RFID device 331 is formed in a similar manner as the RFID device 231a shown in FIG. 2a. Therefore, the RFID device 331 comprises a primary communication interface 345 and a secondary communication interface 340. The primary communication interface 345 comprises an antenna element 346, which in the first operational state of the RFID device 331 is used for a communication between the RFID device 331 and a standard RFID reader. The antenna element 346 may be irreversibly disconnected from a RFID chip of the RFID device 331 by activating a switching element 351.

After disabling the primary communication interface 345 the RFID device 331 is in a second operational state. A communication between the RFID device 331 and a standard RFID reader is no more possible. However, as has already been described above, a communication between the RFID device 331 and the dedicated readout-RFID device 370 is possible by taking benefit of the secondary communication interface 340, which comprises two external galvanic contacts, a first galvanic contact 341 and a second galvanic contact 342. The secondary communication interface 340 is adapted in order to be connected to a dedicated communication interface 380 of the readout-RFID device 370. The dedicated communication interface 380 comprises two external galvanic contacts, a first galvanic contact 381 and a second galvanic contact 382. The spacing and the shape of these galvanic contacts 381 and 382 correspond to the spacing and the shape of the galvanic contacts 341 and 342, respectively.

In order to indicate a user where to place the readout-RFID device 370 relative to the RFID device 331, the RFID device 331 is provided with an indicator 361. The indicator can have various shapes and forms, which are appropriate for clearly indicating a user both the position and the orientation of the readout-RFID device 370, which is supposed to be contacted to the RFID device 331.

In order to allow for a further data transmission from the readout-RFID device 370 to a special reading device (not shown), the readout-RFID device 370 is provided with a communication interface comprising an antenna element 386. Depending on the computational power of the readout-RFID device 370 the data connection between the readout-RFID device 370 and the special reading device may be established by employing known procedures for coding and encryption. Therefore, the privacy of the data extraction is not only maintained in a first step, wherein the data being stored in the killed RFID device 331 are transferred to the readout-RFID device 370 because of a galvanic connection between the killed RFID device 331 and the readout-RFID device 370. The privacy of the data extraction is also maintained in a second step, wherein the data are transferred to the special reading device.

The described extended functionality of RFID devices or RFID tags has e.g. an application in the home of the future where it is envisioned that home appliances will be equipped with RFID readers. Thus, a user who is concerned about his privacy and does not want to be tracked by the objects that he is carrying, request at the point-of-sale terminal that the RFID tags embedded in the products that he is buying are killed. Therefore, the information being stored in the RFID tag cannot be extracted by unauthorized parties using standard RFID readers. Upon reaching his home, the user places a sticky readout-RFID tag on the object that essentially resurrects the functionality of the killed RFID device. At the same time, he is assured that no information is being leaked because the sticky readout-RFID tags are so designed that they interact with RFID readers in a privacy preserving manner, potentially using secure cryptographic protocols. Such protocols may not be available or possible with the original RFID tag, which is e.g. a passive tag because of cost reasons.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS

100 RFID system
110 RFID reader
115 electronic circuit
116 amplitude shift keying modulator/ASK modulator
116a drive signal
120 oscillating circuit
121 signal injecting unit
122 resistor
123 capacitor
124 antenna
125 band pass filter 126 amplifier
127 demodulator
129 output data
130 standard RFID device/standard RFID tag
135 RFID chip
136 RFID circuitry, data memory
136a binary modulation code
137 transistor coupling element
138 diode
139 capacitor
145 communication interface
146 antenna element
147 capacitor
231a RFID device/RFID tag
231b RFID device/RFID tag
231c RFID device/RFID tag
235 RFID chip
236 RFID circuitry, data memory
237 transistor coupling element
238 diode
239 capacitor
240 further communication interface
241 external galvanic contact
242 external galvanic contact
245 communication interface
246 antenna element
247 capacitor
250 command line
250a control command/kill command
251 switching element
252 switching element
253 switching element
254 switching element
256 capacitor
258 capacitor
331 RFID device/RFID tag
340 secondary communication interface
341 external galvanic contact
342 external galvanic contact
345 primary communication interface
346 antenna element
351 switching element
361 indicator
370 readout-RFID device/readout-RFID tag
380 further communication interface
381 external galvanic contact
382 external galvanic contact
385 communication interface
386 antenna element

The invention claimed is:

1. An RFID device comprising:
a data memory;
an electronic circuit arrangement coupled to the data memory, the electronic circuit arrangement having a first operational configuration and a second operational configuration; and
a communication interface coupled to the electronic circuit arrangement,
wherein, in response to a control command, the electronic circuit arrangement is configured to be switched irreversibly from the first operational configuration to the second operational configuration,
wherein, in the first operational configuration, the RFID device is configured to communicate with a standard RFID reader via the communication interface,
wherein, in the second operational configuration, the communication with the standard RFID reader is disabled and the RFID device is configured to communicate with a readout-RFID device by irreversibly switching from an inductive coupling mode to a capacitive coupling mode, and
wherein the electronic circuit arrangement comprises a switch configured to modify an operating frequency of the RFID device by disconnecting an operation capacitor from an oscillating circuit.

2. The RFID device according to claim 1, wherein the RFID device is a passive RFID device.

3. The RFID device according to claim 1 wherein, in the second operational configuration, the RFID device is capable of communicating with the readout-RFID device in a privacy preserving manner.

4. The RFID device according to claim 1 wherein, in the second operational configuration, a spatial read range surrounding the RFID device is limited to a near field communication over a distance at most 1 cm.

5. The RFID device according to claim 1, further comprising a further communication interface configured to exclusively allow communication between the RFID device and the readout-RFID device.

6. The RFID device according to claim 5, wherein the further communication interface comprises a physical contact interface configured to be connected to a corresponding readout interface of the readout-RFID device.

7. A readopt-RFID device comprising a readout communication interface configured to communicate with the RFID device according to claim 1 when the electronic circuit arrangement of the RFID device is in the second operational configuration.

8. The readout-RFID device according to claim 7, wherein the readout communication interface is configured to communicate with the RFID device in a privacy preserving manner.

9. The readout-RFID device according to claim 7, wherein the readout-RFID device comprises authentication capability.

10. An RFID system comprising:
an RFID device; and
a readout-RFID device including a readout communication interface;
the RFID device comprising:
a data memory;
an electronic circuit arrangement coupled to the data memory;
the electronic circuit arrangement having a first operational configuration and a second operational configuration;
a communication interface coupled to the electronic circuit arrangement,
wherein, the readout communication interface is configured to communicate with the RFID device when the electronic circuit arrangement of the RFID device is in the second operational configuration,
wherein, in the first operational configuration, the RFID device is configured to communicate with a standard RFID reader via the communication interface,
wherein in the second operational configuration, the communication between the RFID device and the standard RFID reader is disabled and the RFID device is configured to communicate with the readout-RFID device by irreversibly switching from an inductive coupling mode to a capacitive coupling mode, and
wherein the readout-RFID device is configured to communicate with the standard RFID reader so that the standard reader can access information stored in the data memory of the irreversibly switched RFID device through the readout-RFID device, and wherein the electronic circuit arrangement comprises a switch configured to modify an operating frequency of the RFID device by disconnecting an operation capacitor from an oscillating circuit.

11. The RFID system according to claim 10, further comprising an indicator which allows a user to identify a location on a consumer product were the RFID device is embedded.

12. A method for extracting information stored on a RFID device comprising the acts of:

receiving a control command by the RFID device;

in response to the control command, irreversibly switching the RFID device from a first operational configuration to a second operational configuration wherein, in the first operational configuration, the RFID device is configured to communicate with a first RFID reader and wherein, in the second operational configuration, the RFID device is configured to communicate with a second RFID reader, wherein the irreversibly switching act irreversibly switches the RFID device from an inductive coupling mode to a capacitive coupling mode to disable communication with the first RFID reader and enable communication with the second RFID reader, and wherein the irreversibly switching act includes modifying an operating frequency of the RFID device by disconnecting an operation capacitor from an oscillating circuit; and extracting the information from the RFID device by the second RFID reader; and transmitting the information from the second RFID reader to the first RFID reader.

13. The RFID device of claim 1 wherein, in the second operational configuration, a spatial read range surrounding the RFID device is limited to a near field communication over a distance between 1 cm and 1 mm.

14. The RFID device of claim 1, wherein the electronic circuit arrangement comprises a switching element comprising a first switch set and a second switch set, the first switch set being configured for selectively connecting the electronic circuit arrangement to an antenna for inductively coupling the RFID device to the standard RFID reader, and the second switch set being configured for selectively connecting the electronic circuit arrangement to a capacitor for capacitively coupling the RFID device to the readout-RFID device, and wherein response to the control command, the first switch set is opened to disconnect the electronic circuit arrangement from the antenna and simultaneously the second switch set is closed to connect the electronic circuit arrangement to the capacitor.

15. The RFID system of claim 10, wherein the electronic circuit arrangement comprises a switching element comprising a first switch set and a second switch set, the first switch set being configured for selectively connecting the electronic circuit arrangement to an antenna for inductively coupling the RFID device to the standard RFID reader, and the second switch set being configured for selectively connecting the electronic circuit arrangement to a capacitor for capacitively coupling the RFID device to the readout-RFID device, and wherein, in response to the control command, the first switch set is opened to disconnect the electronic circuit arrangement from the antenna and simultaneously the second switch set is closed to connect the electronic circuit arrangement to the capacitor.

16. The method of claim 12, wherein the irreversibly switching act comprises simultaneously opening a first switch set and closing a second switch set, the first switch set being configured for selectively connecting an electronic circuit arrangement of the RFID device to an antenna for inductively coupling the RFID device to the first RFID reader, and the second switch set being configured for selectively connecting the electronic circuit arrangement to a capacitor for capacitively coupling the RFID device to the second RFID reader.

* * * * *